(12) United States Patent
Derenick et al.

(10) Patent No.: US 9,759,809 B2
(45) Date of Patent: Sep. 12, 2017

(54) LIDAR-BASED SHIPBOARD TRACKING AND STATE ESTIMATION FOR AUTONOMOUS LANDING

(71) Applicant: Sikorsky Aircraft Corporation, Stratford, CT (US)

(72) Inventors: Jason C. Derenick, Hamden, CT (US); Igor Cherepinsky, Sandy Hook, CT (US); Christopher Stathis, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 117 days.

(21) Appl. No.: 14/792,896

(22) Filed: Jul. 7, 2015

(65) Prior Publication Data

US 2016/0009410 A1  Jan. 14, 2016

Related U.S. Application Data

(60) Provisional application No. 62/021,885, filed on Jul. 8, 2014.

(51) Int. Cl.
| | | |
|---|---|---|
| *G01S 7/48* | (2006.01) | |
| *G08G 5/00* | (2006.01) | |
| *G08G 5/02* | (2006.01) | |
| *G01S 17/93* | (2006.01) | |
| *G05D 1/06* | (2006.01) | |
| *G05D 1/08* | (2006.01) | |

(52) U.S. Cl.
CPC .......... *G01S 7/4808* (2013.01); *G01S 17/933* (2013.01); *G05D 1/0684* (2013.01); *G05D 1/0858* (2013.01); *G08G 5/0069* (2013.01); *G08G 5/025* (2013.01)

(58) Field of Classification Search
CPC ... G01S 17/933; G01S 7/4808; G05D 1/0684; G05D 1/0858; G05D 1/0676; G05D 1/0653; G05D 1/0808; G08G 5/0069; G08G 5/025; G08G 5/02; G08G 7/00; G08G 7/02
USPC ...................................... 701/15–17
See application file for complete search history.

(56) References Cited

U.S. PATENT DOCUMENTS

| | | | |
|---|---|---|---|
| 8,457,813 B2 | 6/2013 | Hogstrom et al. | |
| 8,554,395 B2 | 10/2013 | Andersson | |
| 8,626,364 B2 | 1/2014 | Moresve | |
| 2007/0075893 A1* | 4/2007 | Filias ................. | G01C 21/16 342/104 |
| 2011/0066307 A1 | 3/2011 | Hiebl et al. | |
| 2012/0158222 A1* | 6/2012 | Ehlin ................. | G01S 17/023 701/16 |
| 2012/0232795 A1* | 9/2012 | Robertson .......... | G01C 22/006 701/532 |
| 2015/0331111 A1* | 11/2015 | Newman ............ | G01S 17/58 356/4.01 |

* cited by examiner

*Primary Examiner* — Abby Lin
(74) *Attorney, Agent, or Firm* — Cantor Colburn LLP

(57) ABSTRACT

A system and method for state estimation of a surface of a platform at sea, includes receiving sensor signals indicative of LIDAR data for the platform; applying a Bayesian filter to the LIDAR data for a plurality of hypotheses; determining vertical planes representing azimuth and elevation angles for the LIDAR data; applying a robust linear estimation algorithm to the vertical planes; and determining candidate points in response to the applying of the robust linear estimation algorithm.

15 Claims, 4 Drawing Sheets

LIDAR-BASED SHIPBOARD TRACKING AND STATE ESTIMATION FOR AUTONOMOUS LANDING

CROSS-REFERENCE TO RELATED APPLICATIONS

This application claims the benefit of U.S. provisional patent application Ser. No. 62/021,885, filed Jul. 8, 2014, the entire contents of which are incorporated herein by reference.

BACKGROUND

The subject matter disclosed herein relates generally to the field of rotorcraft and, in particular, to a shipboard tracking and state estimation system of a ship deck in order to enable sea-based landing of a helicopter at various sea states.

DESCRIPTION OF RELATED ART

Unmanned aerial vehicles (UAV's), for example, fixed-wing or rotorcraft vehicles are powered aircraft without a human operator. As such, UAV's provide advantages over manned aircraft by removing humans from situations which may be deemed dangerous, for example, during reconnaissance or during search and rescue operations during a natural disaster. Autonomous UAV's are a natural extension of UAV's and do not require real-time control by a human operator. Autonomous UAV's may be required to land on an unprepared site or terrain without human assistance during mission operations or in an emergency.

Sea-based operation of autonomous UAV's presents a multitude of challenges. Autonomous UAV's in sea-based operations must be able to autonomously select a ship deck for landing or delivering cargo in order to be a viable and effective option in sea-based operations. A ship deck is frequently within the wake of the ship superstructure, creating an intensely turbulent environment. Further, significant deck motion from high sea-state conditions causes an autonomous UAV landing target to move constantly with the ship's heaving, pitching, and rolling motion. Current art on autonomous landings on ships has focused on ship deck mounted transponders to measure the relative pose (e.g., position and orientation) of the aircraft to the landing pad. However, this tracking system is not only expensive but renders an unequipped ship unlandable. A system for shipboard tracking and state estimation in order to enable safe landing or cargo delivery by an autonomous UAV on any ship deck is desired.

BRIEF SUMMARY

According to an aspect of the invention, a method for state estimation of a surface of a platform at sea includes receiving, with a processor, sensor signals indicative of LIDAR data for the platform; applying, with the processor, a Bayesian filter to the LIDAR data for a plurality of hypotheses; determining, with the processor, vertical planes representing azimuth and elevation angles for the LIDAR data; applying, with the processor, a robust linear estimation algorithm to the vertical planes; and determining, with the processor, candidate points in response to the applying of the robust linear estimation algorithm.

In addition to one or more of the features described above, or as an alternative, further embodiments could include initializing the filter with an initial state estimate for the platform.

In addition to one or more of the features described above, or as an alternative, further embodiments could include clustering the candidate points into three-dimensional segments.

In addition to one or more of the features described above, or as an alternative, further embodiments could include determining dense planar regions in the candidate points.

In addition to one or more of the features described above, or as an alternative, further embodiments could include determining a refined state estimate of the platform from a robust planar estimation.

In addition to one or more of the features described above, or as an alternative, further embodiments could include determining the state estimation of the platform by applying the Bayesian filter using the refined state estimate.

In addition to one or more of the features described above, or as an alternative, further embodiments could include updating the initial state estimate with the refined state estimate.

In addition to one or more of the features described above, or as an alternative, further embodiments could include applying the Bayesian filter to a plurality of sea-states.

According to another aspect of the invention, a system for state estimation of a surface of a platform at sea includes a sensor system; a processor; and memory having instructions stored thereon that, when executed by the processor, cause the system to: receive sensor signals indicative of LIDAR data for the platform; apply a Bayesian filter to the LIDAR data for a plurality of hypotheses; determine vertical planes representing azimuth and elevation angles for the LIDAR data; apply a robust linear estimation algorithm to the vertical planes; and determine candidate points in response to the applying of the robust linear estimation algorithm.

In addition to one or more of the features described above, or as an alternative, further embodiments could include a processor that is configured to initialize the Bayesian filter with an initial state estimate for the platform.

In addition to one or more of the features described above, or as an alternative, further embodiments could include a processor that is configured to cluster the candidate points into three-dimensional segments.

In addition to one or more of the features described above, or as an alternative, further embodiments could include a processor that is configured to determine dense planar regions in the candidate points.

In addition to one or more of the features described above, or as an alternative, further embodiments could include a processor that is configured to determine a refined state estimate of the platform from a robust planar estimation.

In addition to one or more of the features described above, or as an alternative, further embodiments could include a processor that is configured to determine the state estimation of the platform by applying the Bayesian filter using the refined state estimate.

In addition to one or more of the features described above, or as an alternative, further embodiments could include a processor that is configured to update the initial state estimate with the refined state estimate.

Technical function of embodiments described above includes online tracking and state estimation of a ship deck using LIDAR data for safe landing of an autonomous aerial vehicle at various sea states.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Embodiments describe a system and method for online tracking and state estimation of a platform or ship deck at various sea states using LIDAR data to enable safe landing of an autonomous unmanned aerial vehicles ("UAV"). The embodiments utilize one or more algorithms that utilize a multi-hypothesis Bayesian filter which leverages real-time LIDAR scanner data of ship deck measurements from potentially dense point cloud data.

Figure 1:
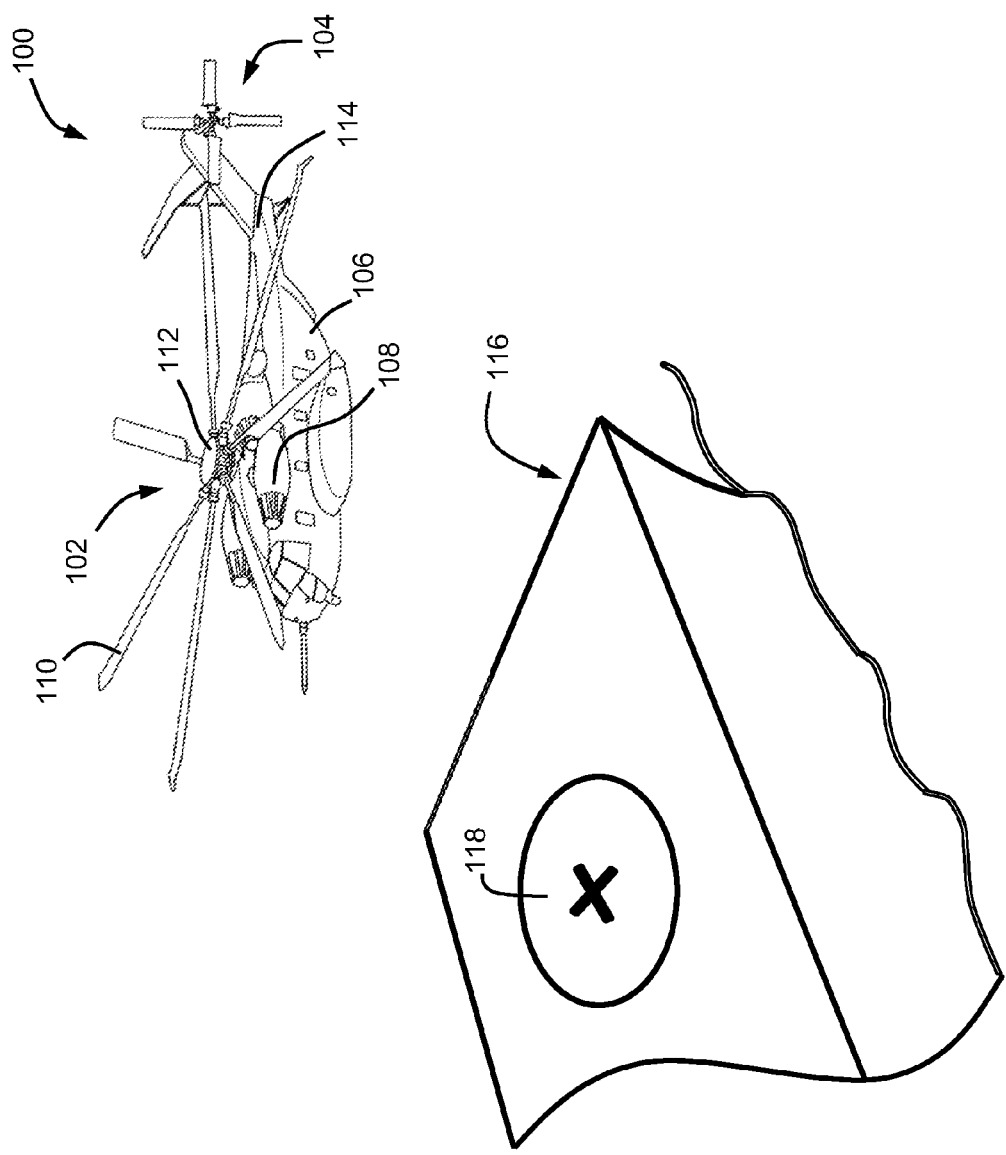
FIG. 1 illustrates an exemplary rotorcraft in accordance with an embodiment of the invention.

Referring now to the drawings, FIG. 1 illustrates an autonomous UAV rotary wing aircraft or helicopter 100 (hereinafter "autonomous UAV 100") which is moving into a position above a ship deck 118 on a ship 116 in accordance with an embodiment of the invention. In other embodiments, autonomous UAV 100 can be approaching a ship deck (or platform) or other surface of a sea-based structure at sea. Aircraft 100 has a main rotor assembly 102, which is driven about an axis of rotation, via a main gearbox, by one or more engines 108. Main rotor assembly 102 includes multiple rotor blades 110 mounted to a rotor hub 112. Aircraft 100 also includes an airframe 106 having an extending tail 114, which mounts a tail rotor system 104, such as an anti-torque system, a translational thrust system, a pusher propeller, a rotor propulsion system, or the like. Although a particular autonomous UAV 100 configuration is illustrated and described in the disclosed embodiment for ship deck landings, other configurations and/or machines in various sea-based applications, such as high speed compound rotary wing aircraft with supplemental translational thrust systems, dual contra-rotating, coaxial rotor system aircraft, turboprops, tilt-rotors, and tilt-wing aircraft for surveillance, transfer of supplies, ship to shore and deep-sea oil rig maintenance operations will also benefit from embodiments of the invention.

Figure 2:
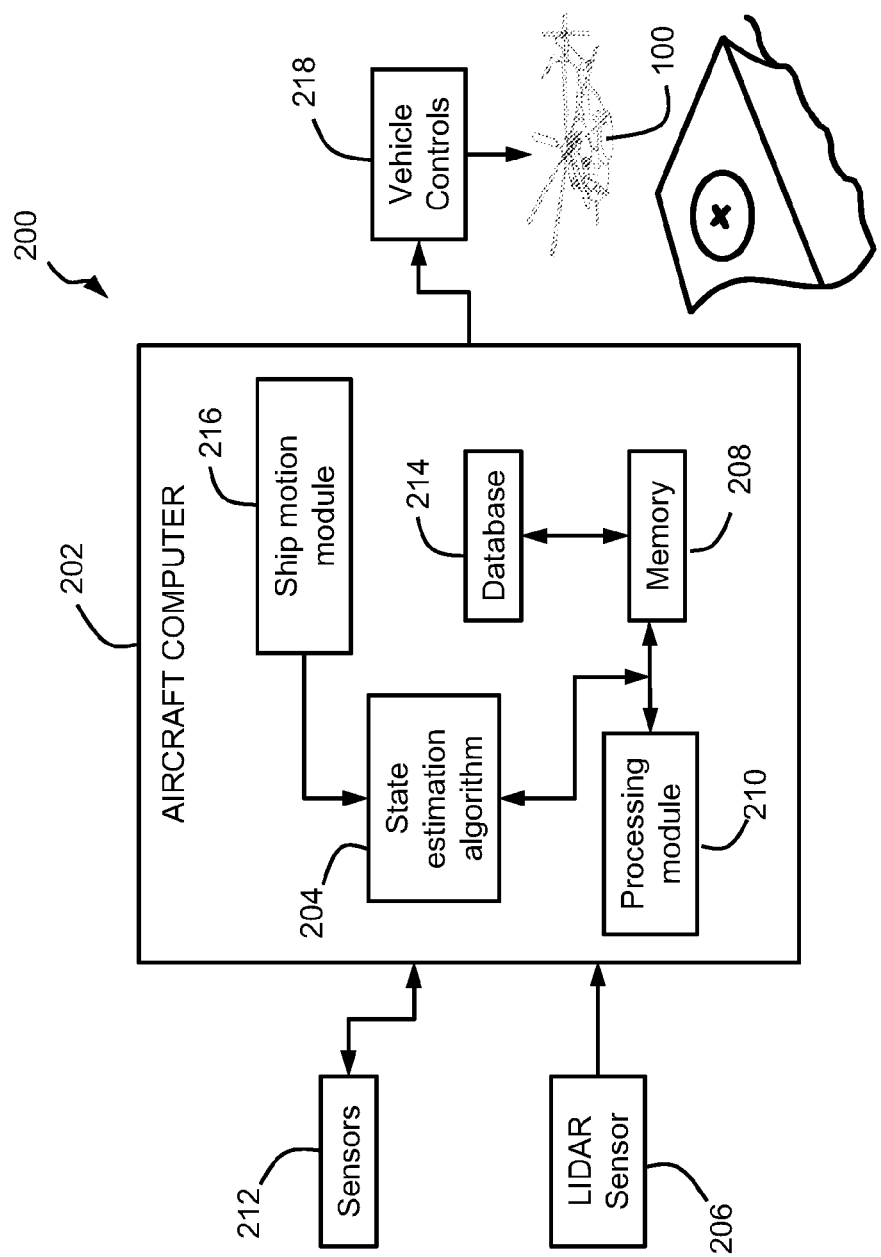
FIG. 2 is a schematic view of an exemplary computing system in accordance with an embodiment of the invention.

FIG. 2 illustrates a schematic block diagram of a system 200 on board autonomous UAV 100 in accordance with an exemplary embodiment. As illustrated, system 200 includes an aircraft computer 202 that executes instructions for implementing a state estimation algorithm 202 for online tracking and state estimation of a ship deck 118 in order to enable safe landing of autonomous UAV 100 at various sea-states. Aircraft computer 202 can receive potentially dense three-dimension ("3D") point cloud data of a ship deck 118 from a Light Detection And Ranging ("LIDAR") scanner 206, e.g., a RIEGL VQ®-480 LIDAR scanner available from RIEGL®, in order to implement state estimation algorithm 204 while airborne. It is to be appreciated that extrinsic calibration parameters of LIDAR scanner 206 are known for transformations from the 3D sensor frame to the vehicle body coordinate frame. These parameters are stored in aircraft computer 202. Other sensors 212 can include navigation systems such as global positioning systems ("GPS"), other global/inertial frame localization infrastructure, for example, an inertial measurement unit ("IMU") that can provide estimates to incremental changes in pose (e.g., position and orientation) of autonomous UAV 100, or sensors that can provide sensed parameters related to the aircraft's angular rate, attitude, acceleration rate, magnitude and direction of wind speed relative to autonomous UAF 100, or the like.

Computer 202 includes a memory 208 that communicates with a processing module 210. Memory 208 stores state estimation algorithm 204 as executable instructions that is executed by processing module 210. The instructions may be stored or organized in any manner and at any level of abstraction, such as in connection with the execution of state estimation algorithm 204. Also, in embodiments, memory 208 may include random access memory (RAM), read only memory (ROM), or other electronic, optical, magnetic or any other computer readable medium onto which is stored the state estimation algorithm 204 described below.

Processing module 210 can be a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. In an embodiment, processing module 210 can include a LIDAR processor in order to process the associated 3D point cloud data using one or more processing algorithms to produce one or more processed signals.

The system 200 may include a database 214. Database 214 may be used to store inertial navigational data that may be acquired by IMU or GPS including pose estimates and operating conditions of the autonomous UAV 100 such as, for example, lateral acceleration, attitude, and angular rate, magnitude, and direction of wind speed relative to autonomous UAV 100. Also, sensor data acquired by 3D-LIDAR, and/or any point cloud data that may be used by state estimation algorithm 204 may be stored in database 214. The data stored in database 214 may be based on one or more other algorithms or processes for implementing state estimation algorithm 204. For example, in some embodiments data stored in database 214 may be a result of the processing module 210 having subjected data received from LIDAR sensor 206 to one or more filtering processes. Database 214 may be used for any number of reasons. For example, database 214 may be used to temporarily or permanently store data, to provide a record or log of the data stored therein for subsequent examination or analysis, etc.

Ship motion module 216 stores one or more ship motion models and provides these to processing module 210. Ship motion models include prediction of the response of ship 116 (FIG. 1) advancing at potentially varying forward speed with arbitrary heading in both regular and irregular seas. System 200 may provide one or more controls, such as vehicle controls 218. Vehicle controls 218 may provide flight control command signals required for flight augmentation of autonomous UAV 100 in order to land on a surface of ship deck 118 (FIG. 1).

Figure 3:
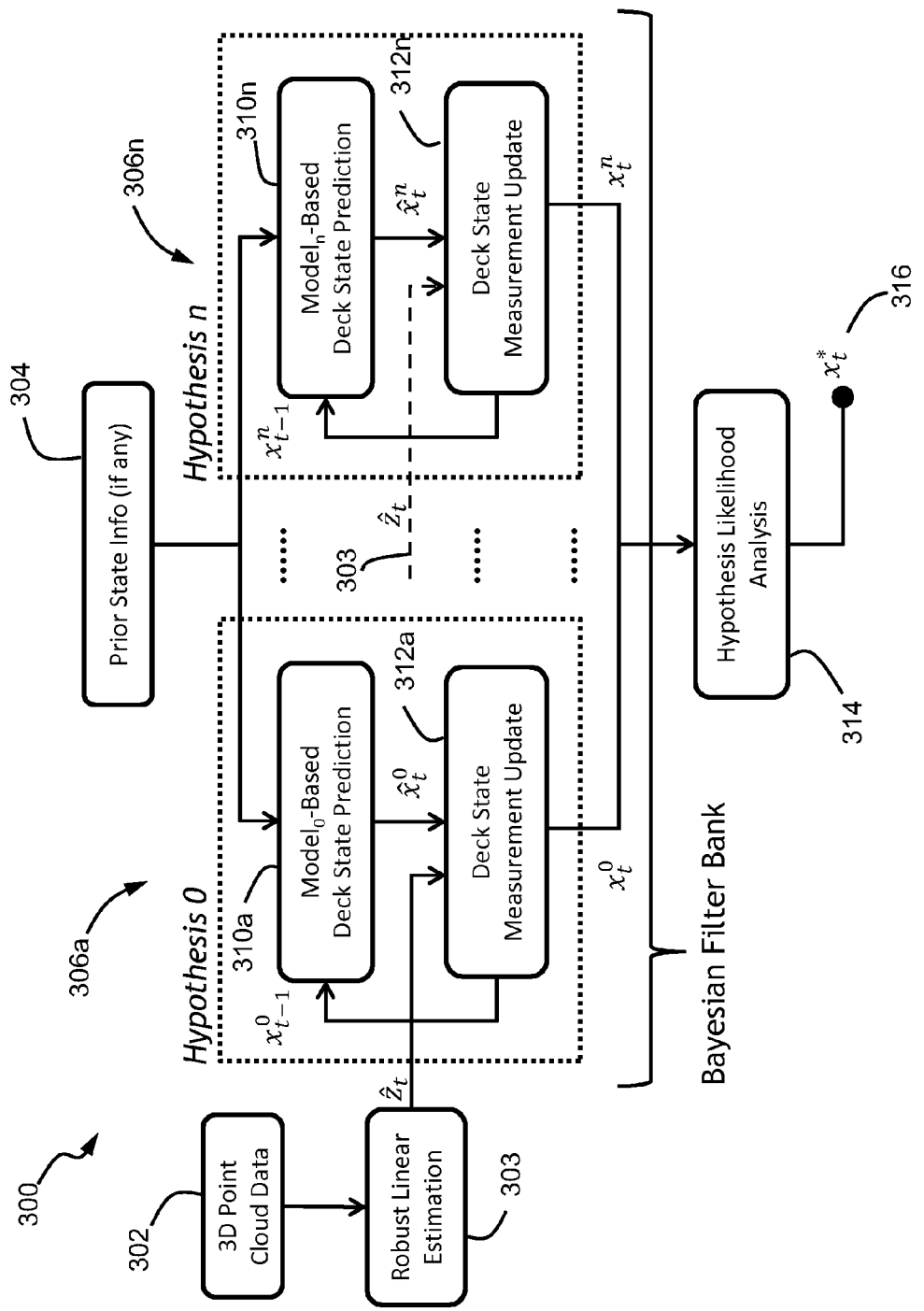
FIG. 3 illustrates a dataflow diagram of a safe landing algorithm in accordance with an embodiment of the invention.

FIG. 3 illustrates an exemplary data flow diagram 300 for implementing a state estimation algorithm 204 (FIG. 2) in accordance with an embodiment of the invention. Particularly, data flow diagram 300 depicts a multi-hypothesis filtering approach for online tracking and state estimation of ship deck 118 (FIG. 2) using processing module 210 of aircraft computer 202 for processing 3D LIDAR point cloud data of ship deck 118. Thus, FIG. 2 is also referenced in data flow diagram 300 of FIG. 3.

The multi-hypothesis filtering approach implements parallelized geometric processing of 3D LIDAR data using separate ship motion models (e.g., a periodic or other suitable model) in each of the hypotheses 306a-306n. Although not required, each hypothesis 306a-306n could correspond to a separate sea state. A multi-hypothesis Bayesian state estimator is employed for each hypothesis 306a-306n, and one hypothesis in the multi-hypothesis 306a-306n has a likelihood that becomes dominant over the other hypotheses. In 302, a 3D point cloud data of ship deck 118 (FIG. 1) is generated and received by aircraft computer 202. In 304, a non-parametric or parametric filter, for example, a standard Bayesian filter (e.g., Extended Kalman Filter, Particle Filter, etc.) is initialized with a prior or initial state estimate of ship deck 118, if available. The Bayesian filter that is employed is commonly associated with a prediction stage and a correction stage.

For each hypothesis 306a-306n, a model-based ship deck state prediction is performed, in 310a-310n. A Bayesian filter is employed by running a separate filter for each hypothesis 306a-306n and then choosing the hypothesis whose posterior has the greatest likelihood compared to the alternatives. Assuming there is some knowledge of prior environmental conditions, the number of hypotheses may be reduced. For each feasible hypothesis 306a-306n, perform the prediction step by applying the ship motion model for each hypothesis 306a-306n.

Figures 4A, 4B:
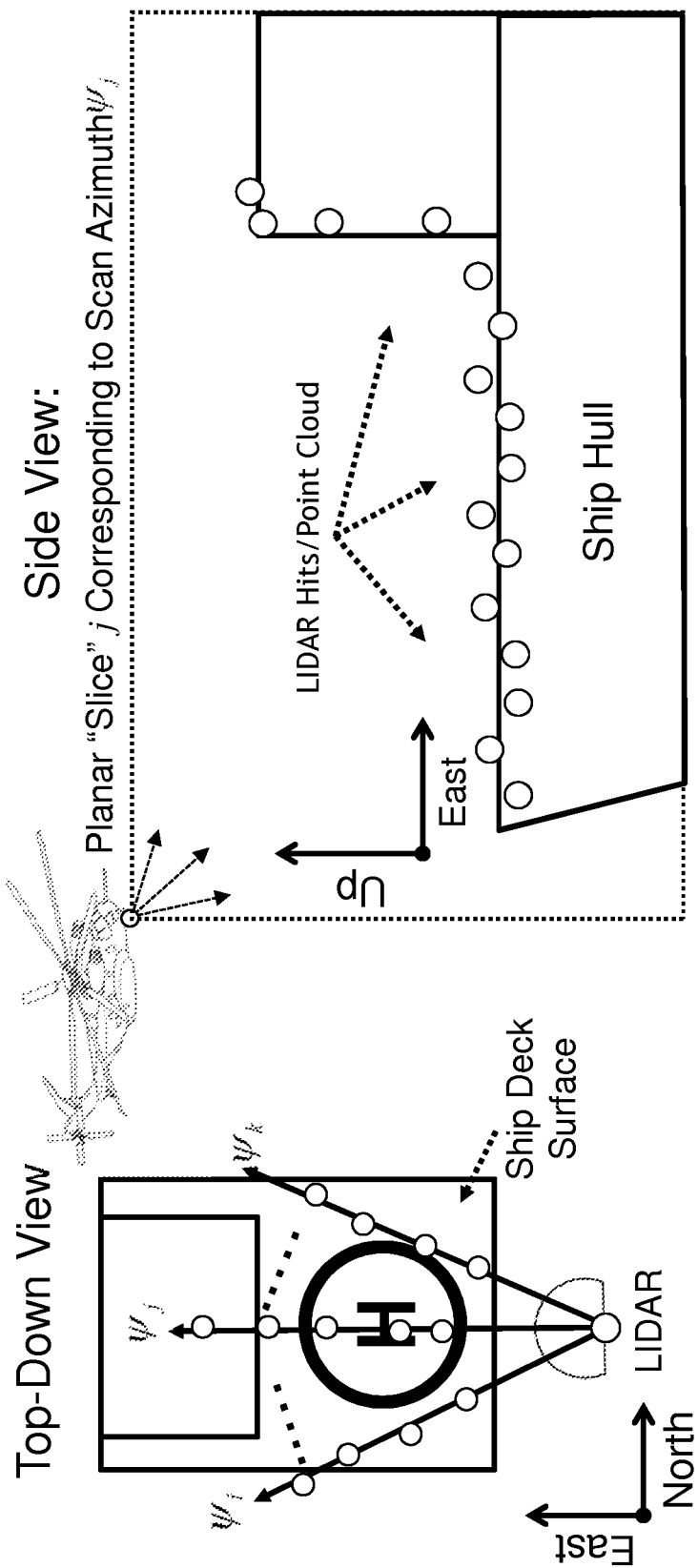
FIG. 4A illustrates processing LIDAR data in accordance with an embodiment of the invention.
FIG. 4B illustrates processing LIDAR data in accordance with an embodiment of the invention.

In 312a-312n, a deck state measurement and update is performed. For example, in a deck state measurement process, the 3D point cloud data is received and processed in two-dimension ("2D") as a collection of independent vertical planes in both vertical and horizontal scan directions. FIGS. 4A and 4B illustrate 2D processing of the 3D point cloud data for azimuth and elevation angles, respectively. With the point cloud data, and assuming autonomous UAV 100 is in a state with modest pitch and/or roll, the 3D point cloud data is partitioned first by the azimuth scan angle and then by elevation angle. The collection of points lies in a vertical plane with each point belonging to a plane in its azimuth angle and another plane in its elevation angle. Next, referring back to FIG. 3, each plane in the azimuth and/or elevation angles is processed independently and in parallel using a robust linear estimator 303. In an embodiment, each plane is processed according to (a), (b), and (c) described below.

(a) For points in the current azimuth/elevation angle, select a subset of points that is approximately distributed uniformly for processing.

(b) Apply a robust linear estimation algorithm such as, for example, an Iteratively Reweighted Least Squares ("IRLS") algorithm, a Random Sample Consensus ("RANSAC") algorithm, or a Hough Transform algorithm to recover the dominant, near-horizontal linear feature in each vertical plane. In embodiments, the IRLS algorithm is applied according to the method disclosed in a non-patent literature publication authored by Patrick J. Green, entitled "Iteratively reweighted least squares for maximum likelihood estimation, and some robust and resistant alternatives" (*Journal of the Royal Statistical Society, Series B (Methodological)*):149-192, 1984), the RANSAC algorithm is applied according to the method disclosed in a non-patent literature publication authored by Martin A. Fischler et al., entitled "Random Sample Consensus: a Paradigm for Model Fitting with Applications to Image Analysis and Automated Cartography" (*Communications of the ACM* 24 (6): 381-395), and the Hough Transform algorithm is applied according to the method disclosed in a non-patent literature publication authored by R. O. Duda et al., entitled "Use of the Hough Transformation to Detect Lines and Curves in Pictures," *Communications of the ACM*, Vol. 15, pp. 11-15 (January 1972), which are herein incorporated by reference. In an embodiment, the IRLS algorithm is applied to the set of points using a linear model for a fixed number of iterations or until convergence. Sample weights may be defined as a function of each point's proximity (e.g., orthogonal distance) to the linear deck surface estimate from a previous IRLS iteration as well as its range from the LIDAR sensor. Intuitively, the closer a point is to the LIDAR sensor and the previous deck estimate, then the more weight it will receive. To prevent divergence, the IRLS solution may be biased (e.g., via a regularization) towards the horizontal plane at the expected height of the ship above sea level.

(c) Upon completion of the linear estimation for the given azimuth/elevation angle, label the points fitting the selected linear model as "candidates" (or "inliers").

In an embodiment, once all azimuth and/or elevation planes have been processed separately in 2D, the points labeled as "candidate" (or "inlier") are collected and clustered into 3D segments. In an example, a density-based clustering algorithm of the point set is performed in order to identify dense planar regions. Points that lack sufficient size and/or density and do not match the expected geometric shape of a ship deck region (e.g., rectangular shape) are ignored. In an embodiment, the density-based clustering algorithm is applied according to the method disclosed in a non-patent literature publication authored by Martin Ester et al., entitled "A density-based algorithm for discovering clusters in large spatial databases with noise" (*Proceedings of the Second International Conference on Knowledge Discovery and Data Mining*, pp. 226-231 (1996), which is herein incorporated by reference. The points comprising the best candidate from the ship deck regions is selected as a set and a robust planar estimation in R is performed over the set of points using a linear estimator. In embodiments, the linear estimator can be an IRLS algorithm, a RANSAC algorithm, or a Hough Transform algorithm. The linear estimator generates results, which is a refined deck state estimate that is used as the current measurement within the Bayesian filter.

Additionally, the ship deck state is updated with the current measurement. In 314, a hypothesis likelihood analysis is performed whereby likelihoods are updated and the most likely hypothesis is reported as a filtered ship state estimate 316. Steps 310a-310n and 312a-312n can be repeated to determine refined ship state estimates 316.

Benefits of the embodiment described herein provide a multi-hypothesis Bayesian filter that leverages real-time LIDAR-based ship deck measurements from potentially dense point cloud, which provides a computationally easier processing scheme.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for state estimation of a surface of a platform at sea, comprising:
   receiving, with a processor, sensor signals indicative of LIDAR data for the platform;
   applying, with the processor, a Bayesian filter to the LIDAR data for a plurality of hypotheses;
   determining, with the processor, vertical planes representing azimuth and elevation angles for the LIDAR data;
   applying, with the processor, a robust linear estimation algorithm to the vertical planes;
   determining, with the processor, candidate points in response to the applying of the robust linear estimation algorithm; and
   landing an aircraft on the surface of the platform that is estimated by the candidate points.

2. The method of claim 1, further comprising initializing the Bayesian filter with an initial state estimate for the platform.

3. The method of claim 1, further comprising clustering the candidate points into three-dimensional segments.

4. The method of claim 3, further comprising determining dense planar regions in the candidate points.

5. The method of claim 2, further comprising determining a refined state estimate of the platform from a robust planar estimation.

6. The method of claim 5, further comprising determining the state estimation of the platform by applying the Bayesian filter using the refined state estimate.

7. The method of claim 5, further comprising updating the initial state estimate with the refined state estimate.

8. The method of claim 1, wherein the applying of the Bayesian filter further comprises applying the Bayesian filter to a plurality of sea-states.

9. A system for state estimation of a surface of a platform at sea, comprising:
   a sensor system of an aircraft;
   a processor; and
   memory having instructions stored thereon that, when executed by the processor, cause the system to:
      receive sensor signals indicative of LIDAR data for the platform;
      apply a Bayesian filter to the LIDAR data for a plurality of hypotheses;
      determine vertical planes representing azimuth and elevation angles for the LIDAR data;
      apply a robust linear estimation algorithm to the vertical planes; and
      determine candidate points in response to the applying of the robust linear estimation algorithm.

10. The system of claim 9, wherein the processor is configured to initialize the Bayesian filter with an initial state estimate for the platform.

11. The system of claim 9, wherein the processor is configured to cluster the candidate points into three-dimensional segments.

12. The system of claim 11, wherein the processor is configured to determine dense planar regions in the candidate points.

13. The system of claim 10, wherein the processor is configured to determine a refined state estimate of the platform from a robust planar estimation.

14. The system of claim 13, wherein the processor is configured to determine the state estimation of the platform by applying the Bayesian filter using the refined state estimate.

15. The system of claim 13, wherein the processor is configured to update the initial state estimate with the refined state estimate.

* * * * *